(No Model.)
H. STENDER.
PHOTOGRAPHIC COPYING CAMERA.
No. 606,593. Patented June 28, 1898.
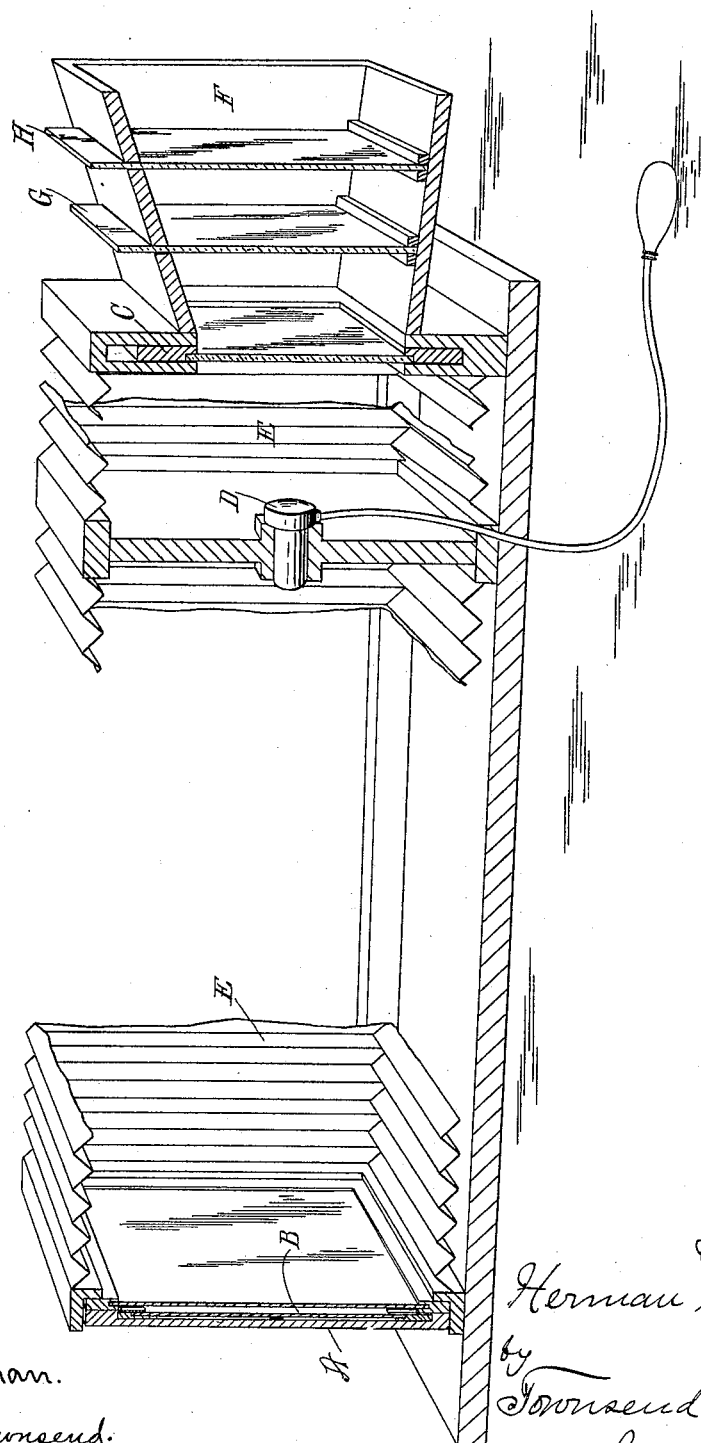
Witnesses
Perry Kingman.
Lottie H. Townsend.
Inventor
Herman Stender
by
Townsend Bros.
his attys.

UNITED STATES PATENT OFFICE.

HERMAN STENDER, OF PROSPECT PARK, CALIFORNIA, ASSIGNOR OF ONE-HALF TO HENRY P. WARE, OF SAN GABRIEL, CALIFORNIA.

PHOTOGRAPHIC COPYING-CAMERA.

SPECIFICATION forming part of Letters Patent No. 606,593, dated June 28, 1898.

Application filed July 12, 1897. Serial No. 644,303. (No model.) Patented in Mexico September 8, 1896, No. 907.

*To all whom it may concern:*

Be it known that I, HERMAN STENDER, a subject of the German Emperor, residing at Prospect Park, in the county of Los Angeles and State of California, have invented new and useful Improvements in Negative-Enlarging Cameras and Process of Printing from Negatives or Transparencies, of which the following is a specification.

My invention relates to certain improvements in enlarging-cameras, upon which I have obtained a patent in Mexico, dated September 8, 1896, No. 907, and to certain improvements in the art of photographing which may be practiced with the aid of such camera.

Large photographic cameras, either for studios or outdoor work, are so costly that only the wealthier galleries can afford them, and their work is unsatisfactory in a great many respects. Every photographer knows that the larger the negative he is going to take the more uncertain are the results. One reason of this is that a diaphragm has to be inserted in order to obtain in focus every part of the subject to be photographed. This shuts out the light considerably, and therefore prolongs the time of exposure, which prolongation is dangerous to pose and expression. It further becomes necessary in order to obtain a focus to press figures and faces together in a very unpleasant, inartistic, and unnatural manner. The most vital difficulty is that all proportions become incorrect and distorted. Take, for instance, a large group of three rows as usually arranged. The figures in the first row look like giants, those of the middle row, as we will suppose, are of correct size, while those of the third row are of the size of dwarfs. Under present conditions a person desiring a large photograph is obliged to elect the size thereof before the negative is taken. Oftentimes the proof proves unpleasing, and several negatives must be taken before a satisfactory negative can be secured. The expense of the negative must always be borne by the person photographed, and a photographer usually estimates such expense in an eighteen by twenty-two negative at not less than twelve dollars. This, in addition to the cost of the photographs, renders large photographs so expensive that only the very wealthy are at present able to obtain them. Under the present method of producing positives negatives produced therefrom are flat and lack detail, showing clearly upon a casual inspection that the photographs are enlargements and not from direct-taken negatives.

An object of my invention is to provide a means whereby the photographer may be induced to only take small negatives, which are inexpensive, and when a satisfactory proof is obtained the person having the photograph taken may elect the size of the photograph desired, and a large plate of the desired size, the image in perfect proportion and equal in quality to the small negative, may be readily secured from the small negative and without the necessity of using more than one large plate. Thus my invention is particularly adapted for economical use, and the expense of large photographs is so reduced as to be brought within the reach of those in moderate circumstances. Not only this, but the photographs themselves, although cheaper in price, are far superior to any photographs from direct-taken large negatives, and it is impossible to discern by any of the usual imperfections that the negative is an enlargement and not direct taken.

Another object of my invention is to provide means whereby I am enabled to print from a negative and to produce therefrom without great skill or care bromids or other prints on highly-sensitive paper of the highest artistic type and photographic perfection.

My invention comprises the various features of construction and combinations of parts hereinafter fully set forth and claimed.

The accompanying drawing shows a fragmental sectional view illustrating a camera embodying my invention.

In the drawing, A represents a plate-holder, within which may be arranged the sensitive plate B, which is to form the large negative.

C is a negative or transparency holder which is arranged in the front end of the camera and is adjustable transverse the camera, and D is a lens arranged between the holder B and the holder C. The usual bellows connection E is arranged between the plate-holders and the lens to allow adjustment of the various parts relative to each other.

In front of the negative or transparency holder C, I provide a light-diffusing chamber F, which, as shown, tapers slightly inward. Within this light-diffusing chamber I arrange two screens G H, which are of white tissue-paper or of glass ground on both sides to intercept the light and diffuse it, so that when it finally reaches and passes through the negative and the lens there are absolutely no side rays or unevenness in the rays of light which act upon the sensitive plate. White tissue-paper is preferable to ground glass, because a purer white light is thus obtained; but I do not claim as my invention any particular character of light-diffusing screen.

I will now explain why I am enabled to produce with my camera a large negative of any desired size and without any of the above-mentioned faults of direct photography.

The principal difficulty in enlarging negatives heretofore has been the tendency of the enlarged negative to take flat—that is to say, the half-tones in the enlarged negative are destroyed. This results from the fact that a transparency produced from a negative can only contain all the qualities of the negative if in producing the transparency light rays are entirely diffused, so that there will be no crossing of the rays or reflections to act upon the sensitive plate. The undiffused light and the shimmer of the surface of the glass of the negative when a transparency is produced in the ordinary manner will cause halation and give when the transparency is photographed a negative having a similar appearance to a negative taken with the camera turned so that the light falls into the lens. By my method of producing the positive in my improved camera, in which there can be no rays of light, this is entirely avoided, and a positive is produced which embodies all of the delicate tones and half-tones of the original negative and when reproduced by photography gives the same effect in the large negative as is present in the small one.

By taking a small negative of not more than eight by ten inches the object can easily be focused sharply to the edge of the plate and taken instantaneously, if desired. Thus it becomes easy to preserve pose and expression, the figures in a group need not be pressed together at all, but may be posed entirely at convenience, and no distortions of any kind are visible.

Every photographer knows that he cannot as successfully take a large negative as he can a small one. Each direct attempt over eight by ten is a failure when compared with a smaller negative of the same character. My camera will make the large negative up to any size as perfect as is the small one from which it is taken.

From the small negative I first make a small positive, or "transparency," as it is generally called, by contact-printing in the large plate-holder, the diffused light causing all the delicate tones and half-tones of the negative to be reproduced in the transparency. Then by inserting this small transparency in the slide at the front piece of the camera I print the large negative from it on a large plate in the plate-holder. If the small negative is perfect, I make a perfect transparency by reason of the entire absence of side rays of light within my camera. If a negative is defective, I correct it by first retouching and deepening the shadows in the transparency and afterward retouching the lights in the negative made therefrom. Any amount of artistic skill may be displayed in this way of double retouching which otherwise could never be secured in common photography.

It is easy to see that photographic copying from old and faded pictures can never be as successfully done by any other process. In any direct-taken negative the retouching-pencil can only build up lights and offers no means by which to improve the shadows, while by my invention both lights and shades may be retouched. By my invention a broken negative, which would otherwise be a certain loss, can be restored by way of reproduction. The broken negative is laid in the plate-holder, the pieces carefully put together, and a contact-transparency made therefrom. The diffused light in the camera strikes the cracks of the broken negative so evenly and softly that they only show like fine hair-lines on the transparency, and these lines can be made to entirely disappear in the double process of retouching.

It is plain to see that if this camera produces successful positives on glass or film it will do the same on any kind of highly-sensitive paper, such as bromid, &c. Every photographer knows what a beautiful thing a good bromid is; but for the following reasons few make them: In the first place, a special room must be built for the purpose. Then they have also to buy an outfit, with camera, lens, easel, &c., which costs considerable money, and then comes in a lot of practice and experience which is so tedious and expensive that the operator usually gives up in despair. A great many photographers who have gone to this expense and trouble have never succeeded in making it a success. Now whoever is able to make a fair negative in an ordinary photographic camera under a skylight and develop it right can make a perfect bromid or print on any highly-sensitive paper in my camera either enlarged or contact. There is no possibility of getting the paper lightstruck or getting the picture out of focus, and if the time of exposure is once determined upon it may be always judged correctly by the image on the focusing-glass, the same as done in direct photography under the skylight.

In using my improved camera the transparency being provided in the manner hereinbefore described it is placed within the transparency or negative holder C and slipped into the front of the camera, as shown in Fig.

1. The operator then adjusts the lens and plate-holder to give the image the desired size upon a ground glass in the plate-holder. The screens G and H are arranged in the light-diffusing chamber to diffuse the light passing through the transparency. Everything being in readiness, the plate-holder A, having a sensitive plate B therein, is arranged in position in the camera, as shown in Fig. 1, and the impression is taken. The impression may be taken either by short or long exposure, just as the transparency may require. By passing the light through the screens the light is reflected from the first screen to the second and then passes through the transparency, being by this time so evenly diffused that in looking through the camera the light appears to be perfectly even.

By printing the transparency in the plate-holder by means of a diffused light admitted through the light-diffusing chamber I prevent direct rays of light and consequent halation, so that all the delicate half-tones of the original negative are reproduced in the positive, and the image thrown upon the ground glass when the positive is placed in the camera is full and as perfect as that of the original negative.

Now, having described my invention, what I claim as new, and desire to secure by Letters Patent, is—

1. A camera having a light-diffusing chamber arranged in front of its negative or transparency holder.

2. A camera provided with a light-diffusing chamber arranged between the lens and the source of light; and light-diffusing screens arranged in such chamber.

3. A camera having in front of its negative or transparency holder, a light-diffusing chamber; and a light-diffusing screen arranged in such chamber.

4. A camera comprising a plate-holder; a negative or transparency holder; a lens arranged between the plate and negative holders; a light-diffusing chamber arranged in front of the negative or transparency holder; and light-diffusing screens arranged in the light-diffusing chamber.

5. The improvement in the art of printing from negatives or positives which consists in intercepting the side rays of light by arranging a light-diffusing chamber in front of the negative or positive, and diffusing the light used in printing by passing it through light-diffusing screens arranged within such chamber.

HERMAN STENDER.

Witnesses:
ALFRED I. TOWNSEND,
F. M. TOWNSEND.